United States Patent [19]
Moelard

[11] Patent Number: 5,636,217
[45] Date of Patent: Jun. 3, 1997

[54] METHOD FOR CONNECTING ROAMING STATIONS IN A SOURCE ROUTED BRIDGED LOCAL AREA NETWORK

[75] Inventor: Hendrik Moelard, Maarssen, Netherlands

[73] Assignee: Lucent Technologies Inc., Murray Hill, N.J.

[21] Appl. No.: 492,555

[22] Filed: Jun. 20, 1995

[30] Foreign Application Priority Data

Apr. 28, 1995 [GB] United Kingdom ............ 9508696

[51] Int. Cl.⁶ .................................... H04L 12/66
[52] U.S. Cl. ..................... 370/338; 455/33.2; 370/401
[58] Field of Search ........................ 370/16.1, 60, 79, 370/61, 85.1, 16, 85.5, 17, 85.12, 85.13, 85.14, 85.15, 94.1, 95.1, 92, 93, 95.3; 455/33.1, 33.2; 379/58, 59, 60

[56] References Cited

U.S. PATENT DOCUMENTS

| | | | |
|---|---|---|---|
| 4,947,390 | 8/1990 | Sheehy | 370/85.13 |
| 5,276,680 | 1/1994 | Messenger | 370/85.1 |
| 5,280,480 | 1/1994 | Pitt et al. | 370/85.13 |
| 5,339,316 | 8/1994 | Diepstraten | 370/85.13 |
| 5,371,738 | 12/1994 | Moelard et al. | 370/85.1 |
| 5,448,569 | 9/1995 | Huang et al. | 370/95.1 |
| 5,490,139 | 2/1996 | Baker et al. | 370/85.13 |

Primary Examiner—Benedict V. Safourek
Assistant Examiner—Ricky Q. Ngo
Attorney, Agent, or Firm—Jason P. DeMont

[57] ABSTRACT

A method to be used in a Source Routed Bridged LAN by which access points maintain location information of mobile stations, and forward packets destined for mobile stations that have moved to another access point. This method resolves the problem that correspondent stations do not (timely) update the routing information to the mobile stations.

16 Claims, 5 Drawing Sheets

METHOD FOR CONNECTING ROAMING STATIONS IN A SOURCE ROUTED BRIDGED LOCAL AREA NETWORK

FIELD OF THE INVENTION

The present invention relates to data communication networks in general, and more particularly, to data communication networks that use source routing and source-transparent routing protocols.

BACKGROUND OF THE INVENTION

It is known that a typical Local Area Network (LAN) can use routing bridges to route data among stations connected to the LAN. The routing bridges receive and transmit data packet-by-packet at data link layer level. There are several protocols to define data routing at data link layer, including: source routing defined by IEEE 802.5, transparent routing defined by IEEE 802.1D, and source-transparent routing which is a are facto industry protocol.

Bridges build according to source routing, transparent routing and source-transparent routing are referred as source routing bridge (SR-bridge), transparent routing bridge (TB-bridge) and source-transparent bridge (SR-TB-bridge), respectively. Analogously, LANs using source routing and transparent routing are referred as source routing bridged LAN (SR-LAN) (e.g., a Token-Ring LAN) and transparent routing bridged LAN (TB-LAN), respectively.

Source muting requires each of the packets to be transmitted to contain route information inserted by a source end station. An SR-bridge uses the routing information to determine whether it should forward the packets, and to what LAN-segment the packets should be sent. A LAN-segment is a part of a LAN where end stations can communicate directly with each other via the LAN media, without the need for an intermediate link, such as a bridge or a router. For example, in a Token-Ring LAN, a LAN-segment is a ring. In an Ethernet LAN, a LAN-segment is a cable including components like "repeaters" or hubs.

According to source routing protocol, a source end station initially invokes a route determination procedure to "find" a route to a destination end station. The source end station transmits copies of a special kind of packet and sends a copy to each possible path. Each copy collects route information while it is being transmitted over LAN-segments and bridges.

When a source end station finds a route to a destination end station, it keeps the routing information so that the information can be inserted for subsequent packets to the same destination end station.

Figure 1:
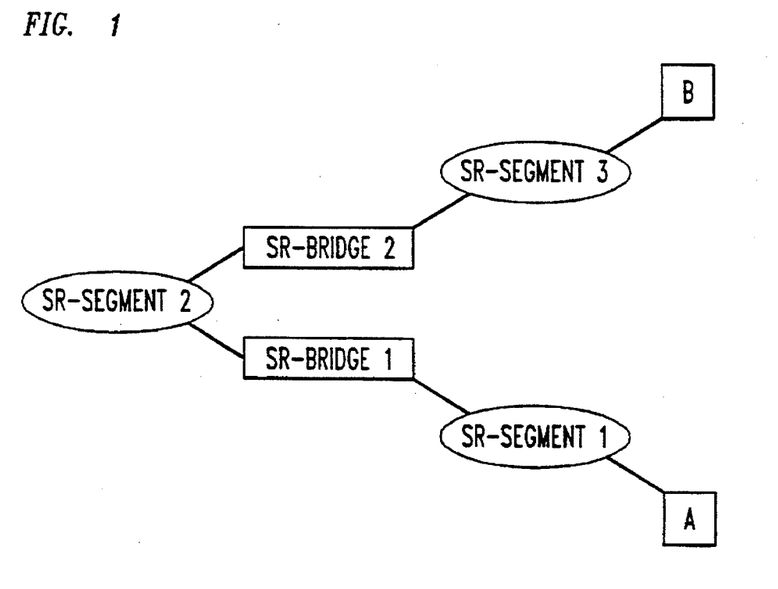
FIG. 1 depicts a typical configuration for an SR-LAN.

FIG. 1 depicts a typical configuration for an SR-LAN, where stations A and B are connected with each other through SR-bridges 1-2 and SR-segments 1-3. By transmitting copies of a special kind of packet and sending a copy to each possible path, station A finds the route to station B as being: SR-segment 1, SR-bridge 1, SR-segment 2, SR-bridge 2, SR-segment 3, and station B. When station A wants to deliver packets to station B, it inserts this routing information into the packets designated for station B.

When station B responds to a message from to station A, station B inserts the same routing information, as it reads from the packet(s) from station A, in reverse order. Whether station B takes this routing information from only the first packet sent by station A, or it continuously updates the routing information from all packets from station A is implementation dependent. In contrast to source routing, transparent routing does not need the route information as required by source routing.

To accommodate the packets with and without the routing information, an SR-TB-bridge is used to connect an SR-LAN to a TB-LAN. Because the packets on a TB-LAN do not contain the muting information required for source routing, an SR-TB-bridge should perform be capable of: (1) responding to any route determination procedure initiated by a station on the SR-LAN, to find routing information for a station on the TB LAN, (2) maintaining the routing information to end stations on the SR-LAN in its location data base, (3) adding the routing information to the packets transmitted by end stations on the TB-LAN and destined for end stations on the SR-LAN based on its location data base, and (4) removing the routing information from the packets transmitted by the end stations on the SR-LAN and destined for the end stations on the TB-LAN.

Conceptually, this process can be regarded as if the SR-TB-bridge handles the source routing procedures on behalf of the stations on the TB-LAN.

A well known commercially available SR-TB-bridge is IBM 8209 LAN Bridge.

Figure 2:
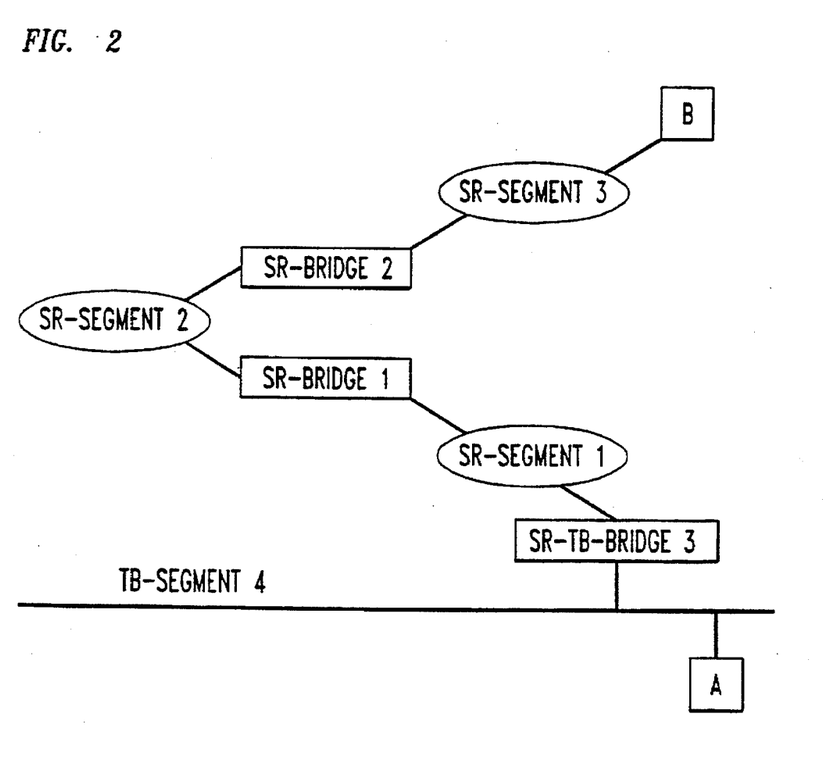
FIG. 2 depicts a typical configuration in which an SR-LAN is connected to a TB-LAN through an SR-TB-bridge.

FIG. 2 depicts a typical configuration where an SR-LAN is connected to a TB-LAN through an SR-TB-bridge. In FIG. 2, stations A and B are connected with each other through SR-bridges 1-2, SR-TB-bridge 3, SR-segments 1-3, and TB-segment 4.

In FIG. 2, if mobile station A transmits the packet destined for station B, this packet is received by SR-TB-bridge 3 on TB-segment 4. If SR-TB-bridge 3 has the routing information to station B stored in its location data base, it will insert this routing information in the packet and forward the packet to station B via the SR-LAN. If the route information to station B is not in its location data base, SR-TB-bridge 3 will invoke a route determination procedure to generate the routing information. The routing information in this example is: SR-segment 1, SR-bridge 1, SR-segment 2, SR-bridge 2, and SR-segment 3.

The problem for a conventional SR-LAN is that it can not properly transmit data in a roaming environment, where a station that is roaming dynamically changes access points on the SR-LAN. The primary reason for this problem is that the muting information is "semi-static" and kept in the correspondent stations the roaming station is communicating with. "Semi-static" means that the information is not constantly, dynamically; updated. It is determined at a certain point in time, and used for some period of time, depending on situations, higher level procedures, implementation, and usage.

U.S. Pat. No. 5,371,738 entitled WIRELESS LOCAL AREA NETWORK SYSTEM WITH MOBILE STATION HANDOVER by H. Moelard et al. discloses a method of handling station roaming in a TB-LAN.

SUMMARY OF THE INVENTION

An illustrative embodiment of the present invention provides a method in a network system, which has a plurality of access points including a first access point and a second access point and a plurality of stations including a first station and a second station. The network system transmits data among the stations according to routing information. The method comprises the steps of: connecting the first station to the first access point; finding the routing information for the first station from the first access point to said second station; removing the first station from the first access point and connecting the first station to the second access point; and updating the routing information from the first access point to the second access point for the first access point, so that data destined for the first station but received by the first access point can be re-transmitted to the second access point.

BRIEF DESCRIPTION OF THE FIGURES

The advantages of the present invention will become apparent to those skilled in the art to which the invention relates from the subsequent description of the preferred embodiments and the appended claims, in conjunction with the accompanying drawing in which:

DETAILED DESCRIPTION

Figure 3:
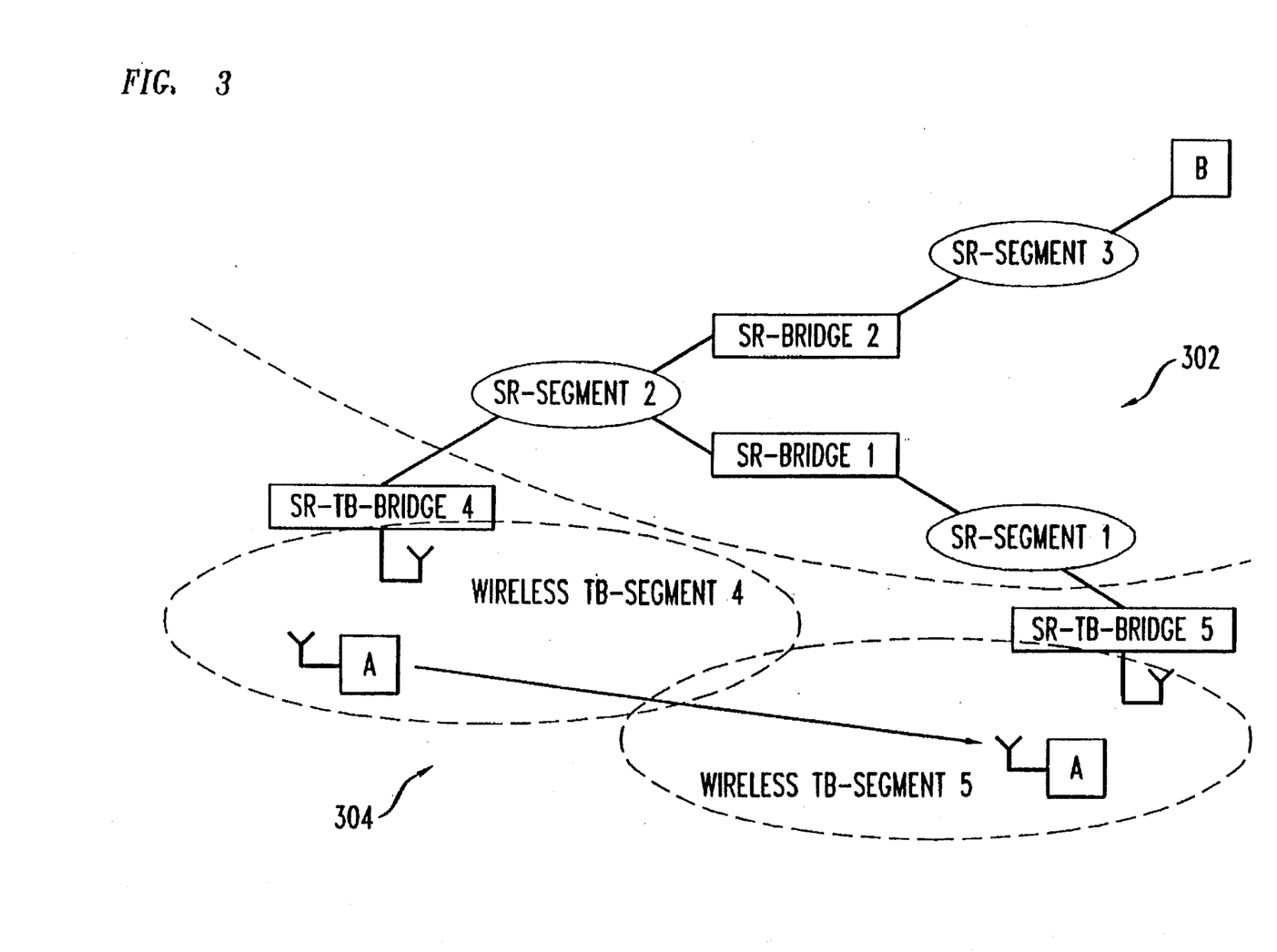
FIG. 3 depicts a network configuration in accordance with one embodiment of the present invention.

FIG. 3 depicts an illustrative network configuration including SR-LAN 302, wireless TB-LAN 304, SR-TB-bridges 4 and 5, mobile station A, and station B. SR-LAN 302 includes SR-segments 1, 2 and 3, and SR-bridges 1 and 2. Wireless LAN 304 includes wireless TB-segments 4 and 5. Mobile station A is preferably wirelessly connected with wireless TB-segment 4 or wireless TB-segment 5. Thus, it can use either SR-TB-bridge 4 or SR-TB-bridge 5 as the access point to SR-LAN 302. Some embodiments of the present invention can update routing information when mobile station A dynamically changes access points between SR-TB-bridge 4 and SR-TB-bridge 5.

When mobile station A is wirelessly connected with wireless TB-segment 4 and wants to communicate with station B, it uses SR-TB-bridge 4 as the access point to SR-LAN 302. SR-TB-bridge 4 receives the packets from mobile station A and inserts the routing information, as being SR-segment 2, SR-bridge 2 and SR-segment 3, into the packets.

When station B sends packets to mobile station A, it inserts the reversed routing information, as being SR-segment 3, SR-bridge 2 and SR-segment 2, into the packets. After the packets have been delivered to SR-TB-bridge 4, it relays the packets to mobile station A via wireless TB-segment 4. Whether station B takes this routing information from only the first packet sent by mobile station A, or it continuously updates this information from all packets sent by mobile station A is implementation dependent.

When mobile station A moves to and is connected with wireless TB-segment 5, it changes the access point to SR-LAN 302 from SR-TB-bridge 4 to SR-TB-bridge 5. The access point change can be executed by WaveLAN procedure, which has been described in the patent application entitled HANDOVER METHOD FOR MOBILE WIRELESS STATION, with Ser. No. 08/065,328 (our docket No. 5577), by Loeke Brederveld et al. Applicant hereby incorporates this patent application by reference.

In response to the change of the access point, SR-TB-bridge 5 now handles the source routing on behalf of mobile station A, and inserts appropriate routing information into the packets transmitted from mobile station A to station B.

In FIG. 3, as to the routing information in the packets transmitted from station B to mobile station A, there are two situations.

In the first situation, station B updates its routing information whenever it receives a packet from a station (mobile station A in this case) it communicates with. SR-TB-bridge 5 inserts the new routing information when mobile station A sends a packet to station B.

Alternatively, to expedite the update of routing information in station B, SR-TB-bridge can send a dummy frame with new routing information to station B on behalf of station A. To do so, mobile station A has to inform SR-TB-bridge 5 that mobile station A is in communication with station B as soon as it switches to SR-TB-bridge 5 as the access point.

When station B uses the new routing information, packets destined for mobile station A will be delivered to SR-TB-bridge 5 for further transfer to station A via wireless TB-segment 5.

In the second situation, station B does not update its routing information when it receives a packet. It continuously uses the routing information that it determined when the connection with mobile station A was established.

In the both situations, before receiving the new routing information from mobile station A, station B will still insert the old routing information, as being SR-segment 3, SR-bridge 2, SR-segment 2 and SR-TB-bridge 4, into the packets for mobile station A. Therefore, to re-route the packets to the changed access point, a hand-off procedure is executed between SR-TB-bridges 4 and 5 as soon as mobile station A switches access points.

The hand-off procedure finds the routing information from SR-TB-bridge 4 to SR-TB-bridge 5 as being SR-segment 2, SR-bridge 1, SR-segment 1 and SR-TB-bridge 5. SR-TB-bridge 4 keeps the routing information to identify that mobile station A is now connected with SR-TB-bridge 5. After receiving a packet delivered for station A, SR-TB-bridge 4 will insert the routing information into the packet and re-route it to SR-TB-bridge 5 for delivery to station A.

When a new connection is being established between mobile station A and station B via SR-TB-bridge 5, the right routing information to station B via SR-TB-bridge 5 is determined.

It should be noted that without updating the routing information, the packet for mobile station A arriving at SR-TB-bridge 4 would be sent to TB-segment 4 and be lost at mobile station A. As a result, station B will (probably after a retry) consider the logical connection to mobile station A as lost.

After loosing a logical connection, a process will be initiated to re-establish the logical connection, usually by higher layer protocols (higher than the data link layer protocol).

In contrast, embodiments of the present invention preferably maintain the logical connection to a mobile station by dynamically updating the routing information.

It should be appreciated that "dynamically updating the routing information" is typically more time efficient than "re-establishment of the logical connection." This is so because the reestablishment of the logical connection is initiated by the event that no response is received from the other station. It takes time to find out that a logical connection has been lost, involving: time-out, retry, time-out again, sending control frames, time-out, . . . ). In addition, the reestablishment of the logical connection requires a route determination procedure, which also takes some time. Furthermore, the initiation of the re-establishment of the logical connection is implementation dependent; it may not be done automatically, but may require user intervention.

Advantageously, updating the routing information as soon as the mobile station changes access points prevents these time consuming processes. The updating process can take place while there is no active communication between the stations.

Figure 4:
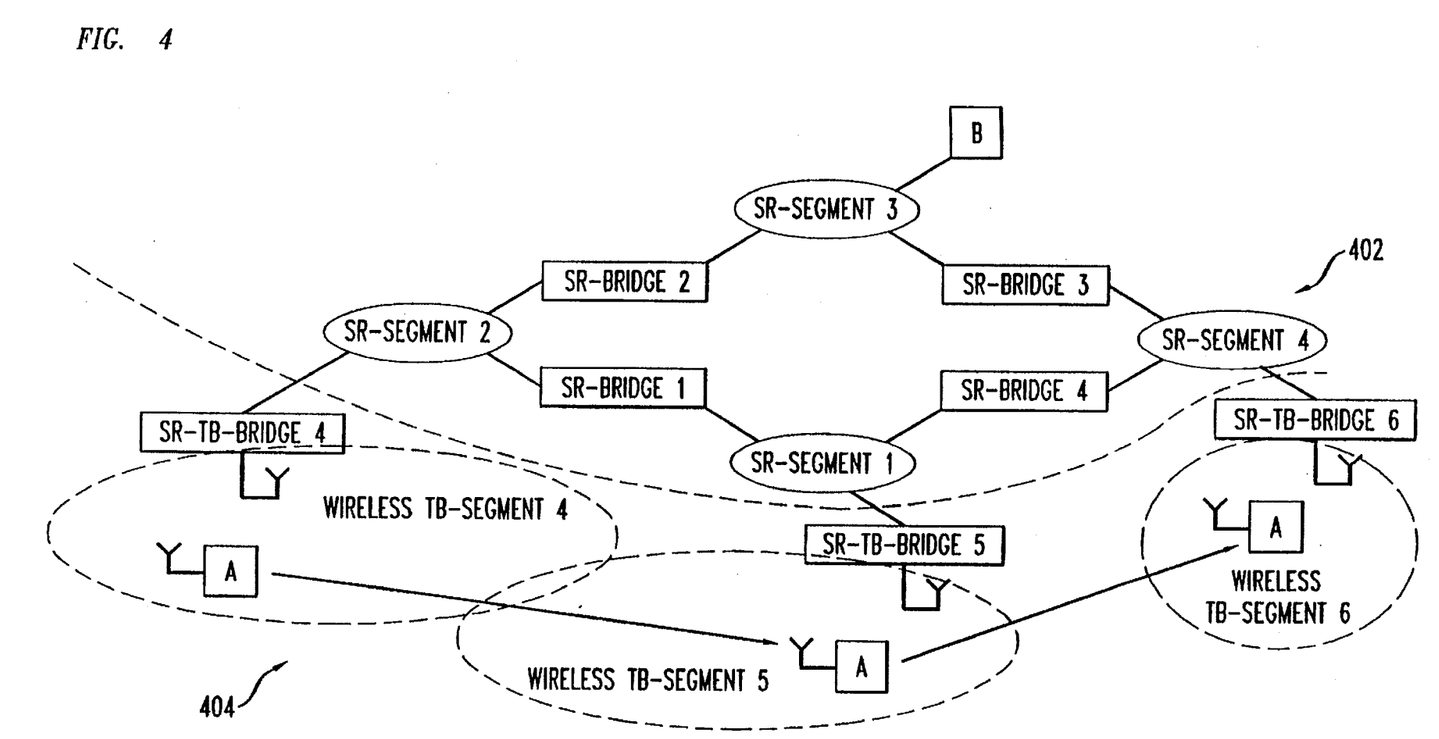
FIG. 4 depicts a network configuration in accordance with another embodiment of the present invention.

FIG. 4 depicts an illustrative network configuration including SR-LAN 402, wireless TB-LAN 404, SR-TB-bridges 4, 5 and 6, mobile station A, and station B. SR-LAN 402 includes SR-segments 1, 2, 3 and 4, and SR-bridges 1, 2, 3 and 4. Wireless LAN 304 includes wireless TB-segments 4, 5 and 6. When mobile station A roams from Wireless TB-segment 4 to wireless TB-segment 5, and further roams to wireless TB-segment 6, the access point will be changed from SR-TB-bridge 4 to SR-TB-bridge 5, then to SR-TB-bridge 6.

In FIG. 4, as to the routing information in the packets transmitted from station B to mobile station A, there are two potential situations.

In the first situation, station B has updated its routing information to SR-TB-bridge 5 after mobile station A roams from wireless TB-segment 4 to TB-segment 5. Under this situation, the hand-off procedure will find the routing information from SR-TB-bridge 5 to SR-TB-bridge 6 as being SR-segment 1, SR-bridge 4, SR-segment 4 and SR-TB-bridge 6. SR-TB-bridge 5 keeps the routing information to identify that mobile station A is now connected with SR-TB-bridge 6. After receiving a packet delivered for mobile station A, SR-TB-bridge 5 will insert the routing information into the packet and re-route it to SR-TB-bridge 6 for delivery to station A.

In the second situation, station B has not updated new routing information after mobile station A roams first from wireless TB-segment 4 to TB-segment 5, and then from TB-segment 5 to TB-segment 6. Under this situation, the hand-off procedure should find the routing information for both SR-TB-bridge 4 and SR-TB-bridge 5, so that the packets destined to mobile station A can be re-routed to SR-TB-bridge 6. This means that the hand-off procedure must involve all access points that once supported mobile station A (SR-TB-bridges 4 and 5 in the example shown in FIG. 4).

One method to update re-routing information for all access points (SR-TB-bridges 4 and 5 in the example shown in FIG. 4) is to send a multicast protocol packet. In Token-Ring terms, the multiple protocol packet is a packet with a Functional Group MAC (Media Access Control) address.

As defined by IEEE standard 802(-1990), every station has a unique MAC address at the sublayer of the OSI data link layer. A destination MAC address can be an individual address (unique for each station), or a multicast address that addresses a group of stations (e.g. all bridges in a LAN can be addressed by a specific multicast MAC address). A special case of multicast address is the "all stations" address, popularly referred to as the "broadcast address."

As an alternative, mobile station A maintains a list of information about all access points it has once used and provide this information to the new access point. During the hand-off procedure, the new access point can then inform all those access points individually. In the example shown in FIG. 4, the list of re-routing information at SR-TB-bridge 6 contains: (1) for SR-TB-bridge 4 as being: SR-segment 2, SR-bridge 1, SR-segment 1, SR-bridge 4, SR-segment 4; and (2) for SR-TB-bridge 5 as being: SR-segment 1, SR-bridge 4, SR-segment 4.

As another alternative, mobile station A only provides the address of its previous access point to the new access point. During the hand-off procedure, after the new access point gets a location update, every access point can then update re-routing information for the previous access point. In this example, SR-TB-bridge 6 updates the rerouting information for SR-TB-bridge 5, and SR-TB-bridge 5 updates the rerouting information for SR-TB-bridge 4.

The information about what mobile stations are attached to what access point is maintained at all access points. In FIG. 4, after the hand-off to SR-TB-bridge 6 has taken place, SR-TB-bridge 4 knows that mobile station A is connected to SR-TB-bridge 6, and the routing information to SR-TB-bridge 6 as being: SR-segment 2, SR-bridge 1, SR-segment 1, SR-bridge 4, SR-segment 4; and SR-TB-bridge 5 knows that mobile station A is connected to SR-TB-bridge 6, and the routing information to SR-TB-bridge 6 as being: SR-segment 1, SR-bridge 4, SR-segment 4.

Figure 5A:
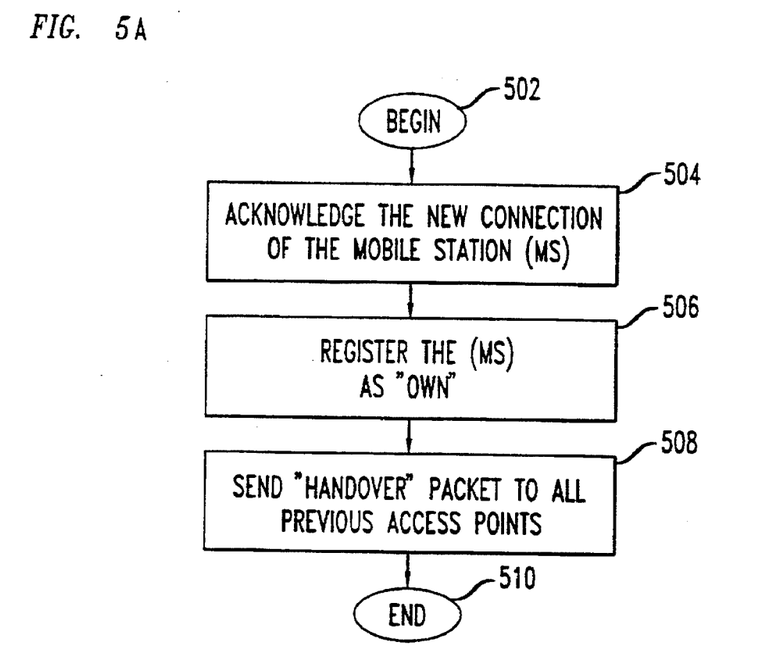
FIGS. 5A and 5B depicts flowcharts showing a hand-off procedure at a new access point and a previous access point, respectively, in accordance with the present invention.

FIG. 5A depicts a flowchart showing the preferred hand-off procedure at a new access point. After a mobile station (MS) has been connected to a new access point, in step 504 the new access point acknowledges the new connection of the mobile station. In step 506, the new access point registers the MS as its "own" station. In step 508, the new access point sends "hand-off" packet to all previous access point(s), possibly by using multicast address.

The function of the "hand-off" packet is to inform the previous access point(s) that mobile station A is now connected to the new access point. The exact format of the "hand-off" packet is dependent on the type of LAN the source routed LAN is, but it generally contains the following information:(1) Destination Address: the multicast address, or the address of the previous access point, the "hand-off" packet is sent to;(2) Source Address: the address of the new access point that sends the "hand-off" packet; and(3) Mobile Station Address: the MAC address of the mobile station this hand-off is for.

The "hand-off" packet will be identified as a "route explorer" packet, which causes, (on its route(s) to the previous access point(s)) the routing information to the new access point will be added by the SR-bridges.

Figure 5B:
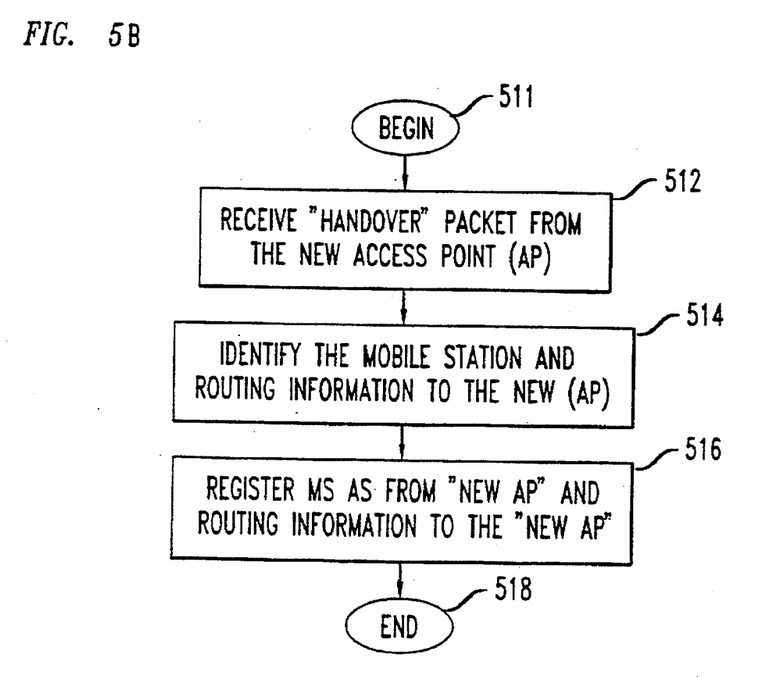

FIG. 5B depicts a flowchart showing the preferred hand-off procedure at a previous access point. In step 512, the previous access point receives the "hand-off" packet from the new access point (AP). In step 514, based on the information in the "hand-off" packet, the previous access point identifies the mobile station and the routing information to the new access point (AP). In step 516, the previous access point registers the mobile station (MS) as from "new AP" and the routing information to the "new AP."

Figure 6:
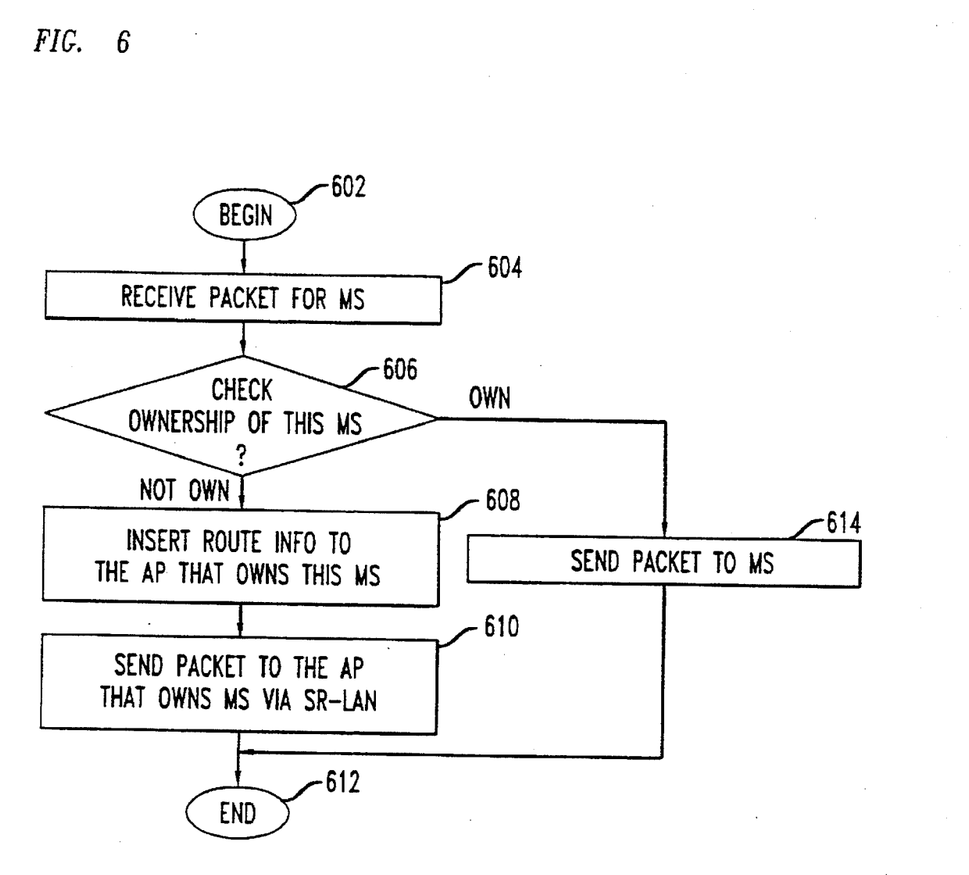
FIG. 6 depicts a flowchart showing the operation at an access point when receiving a packet for a mobile station, in accordance with the present invention.

FIG. 6 depicts a flowchart showing the operation at an access point (which can be a new access point or a previous access point) when receiving a packet for the mobile station. In step 604, the access point receives a packet for a mobile station (MS). In step 606, the access point checks the ownership of this mobile station. If the access point owns this mobile station, in step 614, the access point sends the packet to this mobile station via its own wireless TB-segment. If the access point does not own the mobile station, in step 608 the access point inserts the routing information to the access point (AP) that owns this mobile station. In step 610, the access point send the packet to the access point (AP) that owns this mobile station via SR-LAN.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A method of using a network system having a plurality of access points and a plurality of stations, each of said plurality of stations selectively couplable to each of said plurality of access points, said network system transmitting data among said stations according to routing information stored in said plurality of access points, said method comprising the steps of:

(a) coupling a station to a first one of said plurality of access points;

(b) storing, in said station, a list of at least one of said plurality of access points to which said station has been coupled, said list including data corresponding to said first one of said plurality of access points;

(c) decoupling said station from said first one of said plurality of access points;

(d) coupling said station to a second one of said plurality of access points;

(e) transmitting at least a portion of said list from said station to said second one of said plurality of access points; and (f) updating the muting information as a function of said portion of said list, whereby data destined for said station but received by said first one of said plurality of access points can be routed by said first one of said plurality of access points to said second one of said plurality of access points.

2. The method of claim 1, wherein said step (f) includes the step of storing said updated routing information at said first one of said plurality of access points.

3. The method of claim 1, wherein said network system is an SR-LAN.

4. The method of claim 3, wherein said first one and said second one of said plurality of access points are SR-TB bridges.

5. The method of claim 4, wherein said station can be coupled to said first one and said second one of staid plurality of access points via a wireless TB-LAN.

6. The method of claim 1, further comprising a step (g) wherein said second one of said plurality of access points sends the routing information for said station to said first one of said plurality of access points.

7. The method of claim 6, further comprising a step (h) wherein said first one of said plurality of access points, upon receiving data destined for said station, mutes said data to said second one of said plurality of access points according to the routing information.

8. A method of using a network system having a plurality of access points and a plurality of stations, each of said plurality of stations selectively couplable to each of said plurality of access points, said network system transmitting data among said stations according to routing information stored in said plurality of access points, said method comprising the steps of:

(a) coupling a first one of said plurality of stations to a first one of said plurality of access points;

(b) storing, in said first one of said plurality of stations, a list of at least one of said plurality of access points to which said first one of said plurality of stations has been coupled, said list including data corresponding to said first one of said plurality of access points;

(c) finding the routing information for said first one of said plurality of stations from said first one of said plurality of access points to a second one of said plurality of stations;

(d) inserting, at said first one of said plurality of access points, the routing information into the data to be transmitted from said first one of said plurality of stations to said second one of said plurality of stations;

(e) receiving, at said second station, said data including the routing information;

(f) inserting the routing information, in reverse order, to data to be transmitted from said second one of said plurality of stations to said first one of said plurality of stations;

(g) decoupling said first one of said plurality of stations from said first one of said plurality of access points;

(h) coupling said first one of said plurality of stations to said second one of said plurality of access points;

(I) transmitting at least a portion of said list from said first one of said plurality of stations to said second one of said plurality of access points; and (j) updating the routing information as a function of said portion of said list, whereby data destined for said first one of said plurality of stations but received by said first one of said plurality of access points can be routed by said first one of said plurality of access points to said second one of said plurality of access points.

9. The method of claim 8, wherein said network system is an SR-LAN.

10. The method of claim 9, wherein said first one and said second one of said plurality of access points are SR-TB bridges.

11. A method of using a network system having a plurality of access points and a plurality of stations, each of said plurality of stations selectively couplable to each of said plurality of access points, said network system transmitting data among said stations according to routing information stored in said plurality of access points, said method comprising the steps of:

(a) coupling a first one of said plurality of stations to a first one of said plurality of access points;

(b) finding the routing information for said first one of said plurality of stations from said first one of said plurality of access points to a second one of said plurality of stations;

(c) storing, in said first one of said plurality of stations, a list of at least one of said plurality of access points to which said first one of said plurality of stations has been coupled, said list including data corresponding to said first one of said plurality of access points;

(d) decoupling said first one of said plurality of stations from said first one of said plurality of access points;

(e) coupling said first one of said plurality of stations to a second one of said plurality of access points;

(f) transmitting at least a portion of said list from said first one of said plurality of stations to said second one of said plurality of access points; and (g) updating the routing information as a function of said portion of said list, whereby data destined for said first one of said plurality of stations but received by said first one of said plurality of access points can be routed by said first one of said plurality of access points to said second one of said plurality of access points.

12. The method of claim 11, wherein said network system is an SR-LAN.

13. The method of claim 12, wherein said first one and said second one of said plurality of access points are SR-TB bridges.

14. A method of using a network system having a plurality of access points and a plurality of stations, each of said stations selectively couplable to each of said plurality of access points, said network system transmitting data among said stations according to routing information stored in said plurality of access points, said method comprising the steps of:

(a) coupling a first one of said plurality of stations to a first one of said plurality of access points;

(b) finding the routing information for said first one of said plurality of stations from said first one of said plurality of access points to a second one of said plurality of stations;

(c) storing, in said first one of said plurality of stations, a list of at least one of said plurality of access points to which said first one of said plurality of stations has been coupled, said list including data corresponding to said first one of said plurality of access points;

(d) decoupling said first one of said plurality of stations from said first one of said plurality of access points;

(e) coupling said first one of said plurality of stations to any other one of said plurality of access points;

(f) transmitting at least a portion of said list from said first one of said plurality of stations to said any other one of said plurality of access points; and (g) updating the routing information as a function of said portion of said list, whereby data destined for said first one of said plurality of stations but received by said first one of said plurality of access points can be routed by said first one of said plurality of access points to said any other one of said plurality of access points to which said first one of said plurality of stations is currently coupled.

15. The method of claim 14, wherein said network system is an SR-LAN.

16. The method of claim 15, wherein each of said plurality of access points are SR-TB bridges.

* * * * *

UNITED STATES PATENT AND TRADEMARK OFFICE
CERTIFICATE OF CORRECTION

PATENT NO. : 5,636,217
DATED : June 3, 1997
INVENTOR(S) : Hendrik Moelard

It is certified that error appears in the above-identified patent and that said Letters Patent is hereby corrected as shown below:

Column 7 line 33: Change "updating the muting information" to --updating the routing information--.

Signed and Sealed this

Fourteenth Day of April, 1998

Attest:

BRUCE LEHMAN

Attesting Officer

Commissioner of Patents and Trademarks